United States Patent [19]
Hosaka et al.

[11] Patent Number: 6,095,269
[45] Date of Patent: *Aug. 1, 2000

[54] ELECTRIC WHEELCHAIR

[75] Inventors: Jun Hosaka; Takao Kobayashi, both of Wako, Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/041,272

[22] Filed: Mar. 12, 1998

[30] Foreign Application Priority Data

Mar. 17, 1997 [JP] Japan ................................. 9-063090
Mar. 17, 1997 [JP] Japan ................................. 9-063595

[51] Int. Cl.[7] ................................................ B60K 1/00
[52] U.S. Cl. ........................ 180/65.6; 180/291; 180/907
[58] Field of Search .............................. 180/65.1, 65.3, 180/65.6, 68.5, 907, 908, 291, 292, 293, 297

[56] References Cited

U.S. PATENT DOCUMENTS

| | | |
|---|---|---|
| 1,333,121 | 3/1920 | La Roche . |
| 3,179,199 | 4/1965 | Moran ..................................... 180/65.6 |
| 4,452,327 | 6/1984 | Mowat et al. ............................ 180/11 |
| 4,729,447 | 3/1988 | Morse ..................................... 180/65.1 |
| 4,798,255 | 1/1989 | Wu .......................................... 180/65.1 |
| 5,020,624 | 6/1991 | Nesterick et al. ....................... 180/210 |
| 5,150,762 | 9/1992 | Stegeman et al. ....................... 180/208 |
| 5,238,082 | 8/1993 | Stegeman et al. ....................... 180/208 |
| 5,307,890 | 5/1994 | Huang . |
| 5,322,140 | 6/1994 | Bussinger ............................... 180/65.1 |
| 5,697,465 | 12/1997 | Kruse ..................................... 180/65.1 |
| 5,727,642 | 3/1998 | Abbott ................................... 180/65.1 |

FOREIGN PATENT DOCUMENTS

| | | |
|---|---|---|
| 0 844 169 | 5/1998 | European Pat. Off. . |
| 3-80503 | 12/1991 | Japan . |
| 5-17046 | 5/1993 | Japan . |
| 5-58343 | 8/1993 | Japan . |
| 5-39696 | 10/1993 | Japan . |
| 2 092 969 | 8/1982 | United Kingdom . |
| 2 127 704 | 4/1984 | United Kingdom . |
| WO 94/17769 | 8/1994 | WIPO . |

OTHER PUBLICATIONS

Oct. 1998, Communication from European Patent Office and attached Search Report.
Oct. 1982, "Expansion for Electric Cars" *Engineering in Medicine*, vol. 11, No. 4, p. 193.

*Primary Examiner*—J. J. Swann
*Assistant Examiner*—Christopher D Bottorff
*Attorney, Agent, or Firm*—Merchant & Gould P.C.

[57] ABSTRACT

An electric wheelchair has two front wheels and two rear wheels and is thus four-wheeled. The wheelchair has a tread between the rear wheels, which is smaller than a tread between the front wheels. It also has a floor disposed between the front wheels and rear wheels and having side ends positioned externally of outer surfaces of the rear wheels. Thus, a crew can drive the wheelchair using the front body width of the wheelchair as a reference while paying little attention backward. A motor and a reduction gear as components of a rear wheel driving mechanism are laid compactly on a rear wheel axle one over the other. This reduces the body length and enables down-sizing of the wheelchair.

4 Claims, 8 Drawing Sheets

ELECTRIC WHEELCHAIR

BACKGROUND OF THE INVENTION

1. Field of the Invention

The present invention relates generally to an electric wheelchair for aged persons or the like and, more particularly, to a four-wheeled electric wheelchair propelled by power from an electric motor driven by a battery.

2. Description of the Related Art

In recent years, electric wheelchairs, employing an electric motor driven by a battery, have been developed for the aged with feeble lower limbs and physically-handicapped persons. These wheelchairs run at a walk speed of a human and are thus easy for the aged to drive and may conveniently be used to go out for shopping and visit their neighbors. The electric wheelchairs are used particularly by the aged with weakened lower limbs, because they broaden the sphere of activity of the aged.

Such electric wheelchairs are disclosed, for example, in Japanese Utility Model Publication Nos. HEI 3-80503 and HEI 5-39696. The disclosed electric wheelchairs are of the type having one front wheel and two rear wheels, that is, three-wheeled.

Normally, persons of advanced age have a poor sense of balance and are incapable of instantaneous actions. Thus, the electric wheelchairs are required to provide sufficient stability during travel thereof. However, due to their inherent construction, the three-wheeled electric wheelchairs of the described type have a drawback in that they are unstable during travel thereof.

Four-wheeled electric wheelchairs having two front wheels and two rear wheels are most desired from the standpoint of travel stability. With this in view, the present inventors have proposed such four-wheeled electric wheelchairs in Japanese Patent Publication No. HEI 5-58343 and Japanese Utility Model Publication No. HEI 5-17046.

In the disclosed four-wheeled electric wheelchairs, the tread between the rear wheels is larger than the tread between the front wheels. Correspondingly, the body width at the rear part of the wheelchairs is larger than the body width at the front part of the wheelchairs.

When driving such wheelchairs, drivers constantly look ahead and are thus likely to use the front body width of the wheelchairs as a reference in determining whether they could pass an obstacle such as a curb. Accordingly, where the rear bodies of the electric wheelchairs have a width larger than that of a front body, there is a fear that an obstacle is hit by either of the rear wheels.

Generally, persons of advanced age with weakened lower limbs get aboard the electric wheelchairs from the sideways of the rear parts thereof while supporting themselves by holding onto the seats or their backs in the wheelchair rear parts. Thus, in the electric wheelchairs with their rear body parts projected laterally due to the rear wheels incorporated therein, difficulty is often experienced in getting on and off, because the projected rear body parts do not allow the aged persons to stand or position their legs closely to the wheelchairs. Thus, improvements are desired of the electric wheelchairs in that respect.

Further, when the electric wheelchairs having the larger tread between the rear wheels than the tread between the front wheels make a turn, the distance between the tracks of the inner or turn side front and rear wheels (inner track difference) becomes large, thereby leaving a fear that the turn side rear wheel may hit an obstacle such as a curb in the turn side rear wheel's track. Thus, the electric wheelchairs, when designing for use by the aged, should incorporate improvements made to negate such fear.

Moreover, it is desired that the electric wheelchairs be stable while running and have high maneuverability. For this reason, the electric wheelchairs need to be small-sized.

However, as can be readily appreciated from the foregoing publications, in the rear wheel drive mechanism including a motor and a reduction gear, the motor and the reduction gear are respectively positioned forwardly and backwardly of an axle, thereby increasing the longitudinal lengths of the electric wheelchairs. As an alternative, the motor and the reduction gear may be positioned transversely of the wheelchair bodies but this will increase the widths of the wheelchairs.

SUMMARY OF THE INVENTION

According to a first aspect of the present invention, there is provided an electric wheelchair comprising two front wheels, two rear wheels, a seat disposed at a widthwise center of the electric wheelchair, a steering handle for steering the front wheels, a flat floor disposed between the steering handle and the seat below the seat, a battery and a rear wheel driving motor disposed below the seat, wherein a tread between the rear wheels is smaller than a tread between the front wheels, and the floor has opposed side ends located externally of outer surfaces of the rear wheels so that it has a larger width than a distance between the rear wheel outer surfaces.

Because the tread between the rear wheels is smaller than the tread between the front wheels, the electric wheelchair has a rear body smaller in width than a front body thereof. This avoids hitting an obstacle by the rear body of narrow width when driving the wheelchair using the front body width as a reference.

Further, when making a turn by steering the front wheels, the difference between the tracks of the turn side or inner front and rear wheels can be kept to a minimum, whereby a natural, smooth and sharp turning can be achieved, avoiding an obstacle that may otherwise be hit by the turn side rear wheel.

Still further, the floor is provided with the opposed ends positioned externally of the outer side surfaces of the rear wheels so that it has a large width. As a result, it becomes easy for a crew to get on and off the wheelchair, because there are no protrusions on the sides of the rear wheelchair body, which may obstruct the legs of the crew.

According to a second aspect of the present invention, there is provided an electric wheelchair comprising two front wheels, two rear wheels, a seat disposed at a widthwise center of the electric wheelchair, a steering handle for steering the front wheels, a flat floor disposed between the steering handle and the seat below the seat, a battery and a rear wheel driving motor disposed below the seat, wherein the rear wheels are larger in diameter than the front wheels, the electric wheelchair further includes a reduction gear and a rear wheel axle, and the rear wheel driving motor and the reduction gear are vertically disposed on the rear wheel axle one over the other.

Provision of the motor and the reduction gear as components of the rear wheel driving mechanism vertically on the rear wheel axle one over the other makes the length of the wheel base shorter than that of the conventional arrangement in which the motor and the reduction gear are disposed on the front and rear sides of the axle. This further leads to the reduction of the length of the wheelchair, thereby downsizing the wheelchair.

Further, by positioning the battery below the seat and the motor and the reduction gear on the rear wheel axle, a space below the seat can be used effectively. Particularly, by positioning the heavy motor and reduction gear collectively on the rear wheel axle, an increased vertical load is exerted to the axle, whereby the electric wheelchair is rendered stable while running and the rear wheels are contacted against the road surface with an increased pressure, thereby increasing efficiency of transmission of the driving force from the motor to the rear wheels.

In a preferred form, the driving motor and the reduction gear are positioned within an upper half of an outline of the rear wheels as viewed them from sideways, and between the rear wheels as viewed them from a front-and-rear direction. By positioning them within the rear wheel outline, the motor and the reduction gear can be protected from obstacles that may be present at the sides of the rear wheels.

Since the driving mechanism composed of the motor and the reduction gear is disposed between the rear wheels such that they are vertically arranged one over the other on the rear wheel axle, the tread between the rear wheels can be kept to a minimum, thereby reducing the body width of the electric wheelchair. This results in the electric wheelchair reduced in both longitudinal and transverse dimensions, which is thus easy to operate.

BRIEF DESCRIPTION OF THE DRAWINGS

A preferred embodiment of the present invention will hereinafter be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
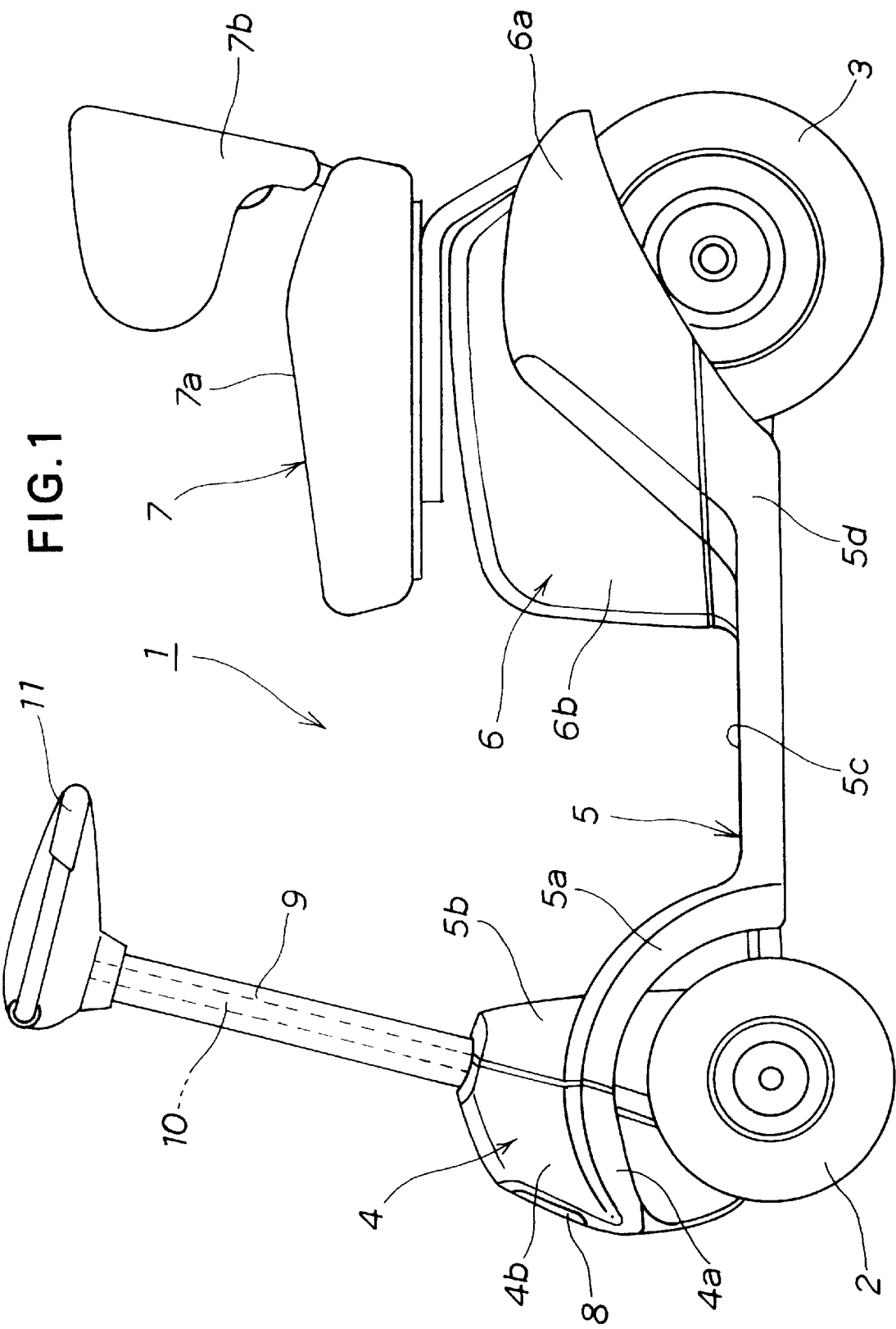
FIG. 1 is a side view illustrating an electric wheelchair according to the present invention.
Figure 2:
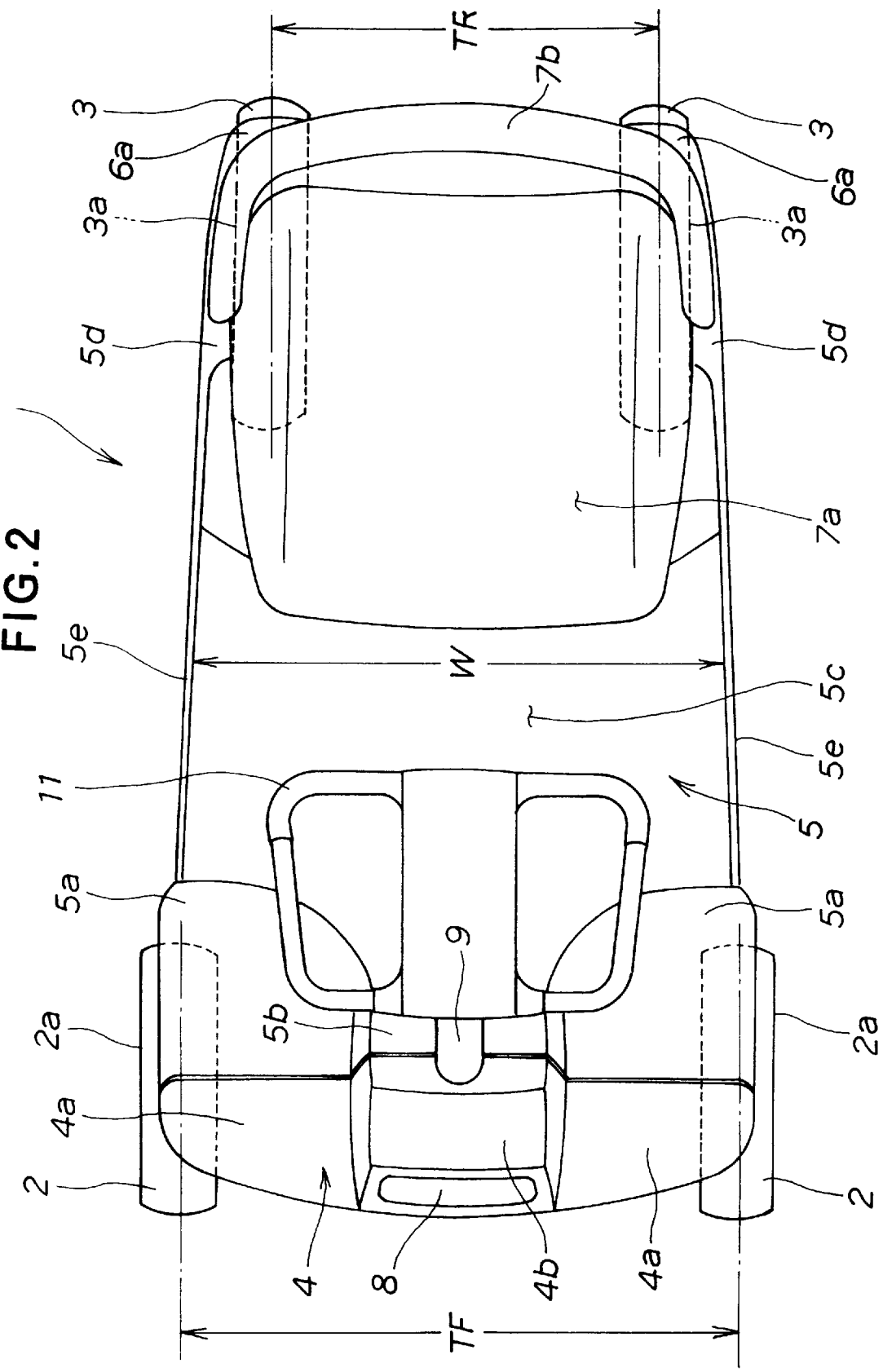
FIG. 2 is a top plan view illustrating the electric wheelchair of FIG. 1.
Figure 3:
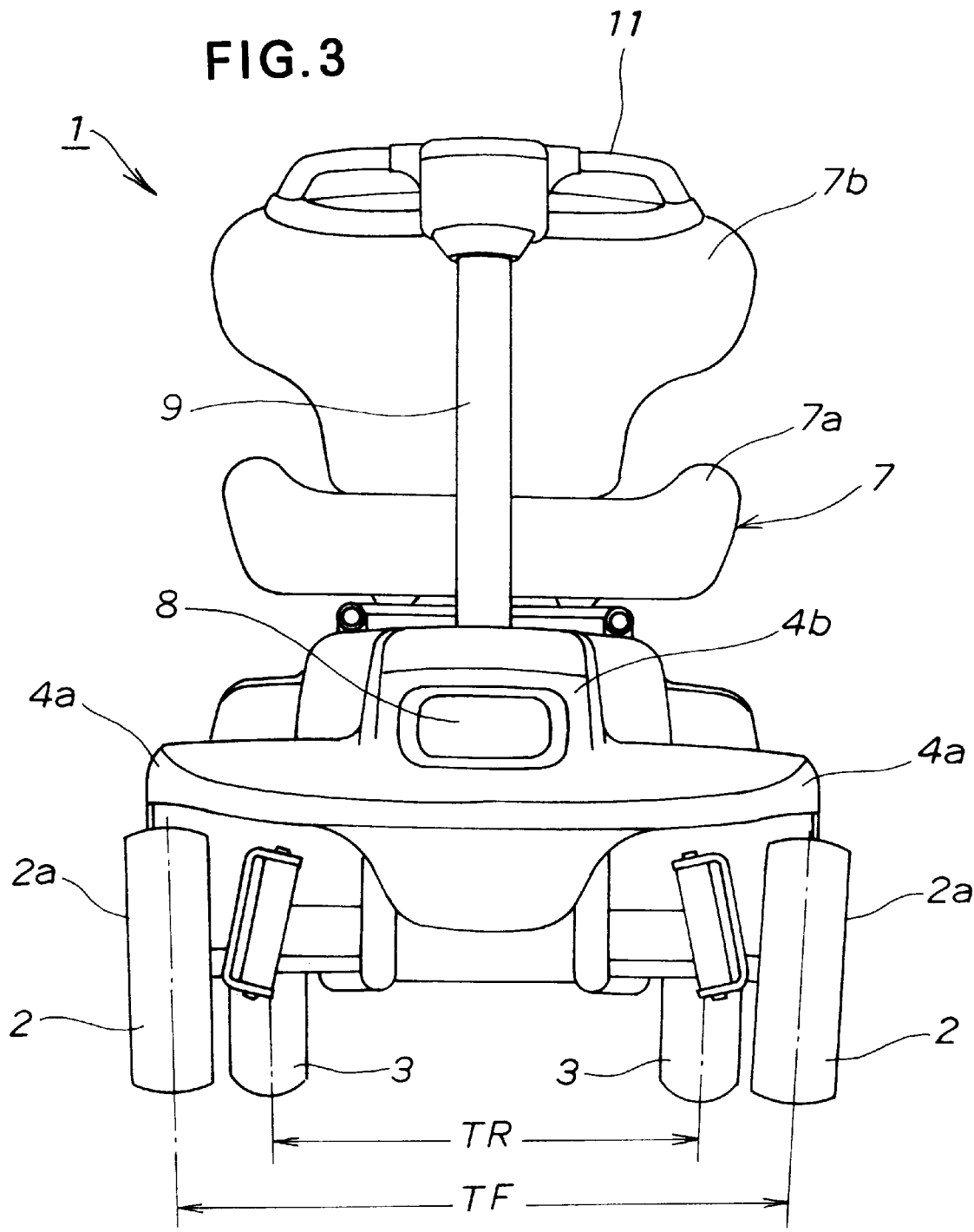
FIG. 3 is a front view illustrating the electric wheelchair of FIG. 1.

Referring to FIGS. 1–5, an electric wheelchair 1 of the present invention has a pair of right and left front wheels 2, 2 and a pair of right and left rear wheels 3, 3 and is thus four-wheeled. The front wheels 2, 2 are steered wheels while the rear wheels 3, 3 are driving wheels. The rear wheels 3, 3 have a diameter larger than that of the front wheels 2, 2. A front cover 4 for covering a steering mechanism described below is disposed between front halves of the front wheels 2, 2 for forming part of an external appearance of the electric wheelchair 1. As shown in FIG. 2, the front cover 4 includes at both sides thereof front fender front halves 4a, 4a and at a frontal center thereof a bulged portion 4b protruding upwardly. A headlight 8 is mounted to a front part of the bulged portion 4b.

Flat floor 5 for resting the feet of a driver is provided between the front wheels 2, 2 and the rear wheels 3, 3. The floor 5 is comprised of a flat, lowered floor portion 5c, a bulged portion 5b forming a rear half of the bulged portion 4b of the front cover 4, front fender rear halves 5a, 5a provided at both sides of the bulged portion 5b, and rear side portions 5d, 5d extending rearwardly from the sides of the floor portion 5c. The front fender rear portions 5a, 5a and the front fender front halves 4a, 4a of the front cover 4 jointly form a front fender for the front wheels 2, 2. The rear side portions 5d, 5d are positioned below the sides of a sitting portion 7a of a seat 7 in opposed relation thereto.

Rear cover 6 is disposed on the rear side portions 5d, 5d such that they cover a lower periphery of the seat 7. The rear cover 6 has side portions 6b, 6b and rear fenders 6a, 6a extending from an intermediate to a rear part of the side portions and covering the upper parts of the rear wheels 3, 3.

Figure 4:
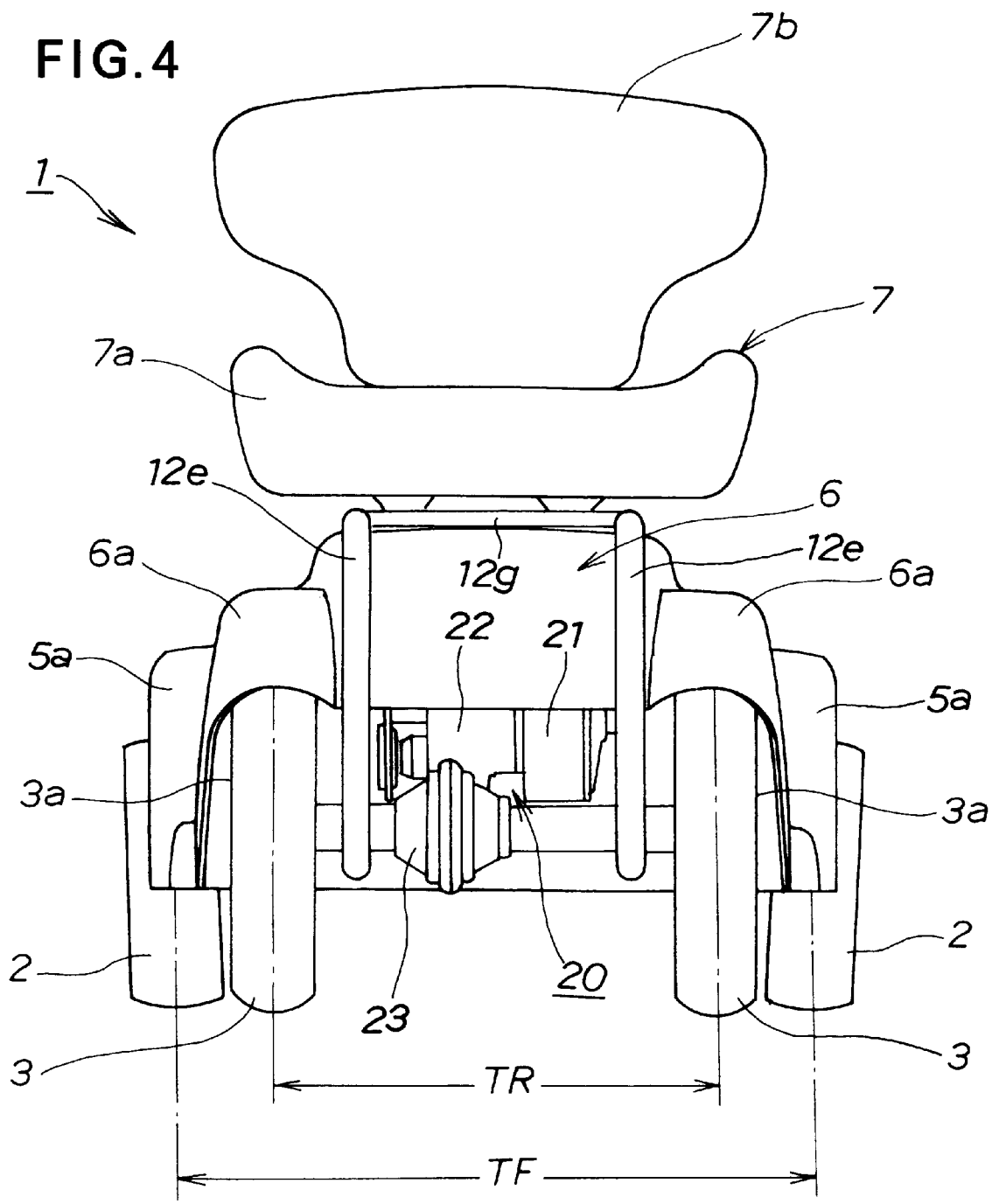
FIG. 4 is a rear view illustrating the electric wheelchair of FIG. 1.

The seat 7 is disposed obliquely forwardly upwardly of the rear wheel therebetween and is comprised of the sitting portion 7a on which a crew or driver may sit, and a backrest 7b rising from a rear part of the sitting portion 7a for supporting the back of the crew. As can be seen from the plan view of FIG. 2, the sitting portion 7a has a large width so that it can support the buttocks of the aged stably as he sits thereon. The backrest 7b is disposed at a relatively high position so that it can make the aged feel comfortable and support his back stably. As shown in FIG. 4, in the embodiment being described, the backrest 7b has a substantially T-shaped configuration.

Handle post 9 extends upwardly from a central part of the bulged portion 4b of the front cover 4 such that its upper part is inclined backwardly. A steering shaft 10 passes through the handle post 9. Mounted to an upper end of the steering shaft 10 is a steering handle 11 which is in the shape of a rectangular loop shape as shown in FIG. 2.

The described electric wheelchair 1 is designed to have a rear wheel tread TR, a center-to-center distance between the right and left rear wheels 3, 3, smaller than a front tread TF, a center-to-center distance between the right and left front wheels 2, 2. The interrelations between the front wheel tread TF and the rear wheel tread TR are as shown in FIGS. 2, 3, 4 and 7.

When the electric wheelchair 1 makes a turn as a result of the front wheels 2, 2 being steered right or left through the steering handle 11, there occurs what may be termed an inner track difference (distance between the tracks of turn side front and rear wheels). However, in the electric wheelchair 1 of the present invention, since the rear wheel tread TR is smaller than the front wheel tread TF, such inner track difference can be kept to a minimum. As a result, instances can be prevented in which an obstacle such as a curb bordering a roadway and a sidewalk is hit by the turn side rear wheel 3 following an inner track than that of the turn side front wheel 2, even when the front wheels 2, 2 are steered using them as a width reference.

In the electric wheelchair 1 of the present invention, since the rear wheel tread TR is set to be smaller than the front wheel tread TF, the inner track difference can be kept to a minimum, thereby enabling safe and smooth turning of the electric wheelchair 1 using the distance between the right and left front wheels 2, 2 as a reference. Smooth turning of the electric wheelchair 1 can also be made by the aged who have little or no experience in driving automobiles.

Further, in the electric wheelchair 1 of the present invention, the flat floor 5 is designed to have a width larger than the distance between outer surfaces 3a, 3a of the rear wheels 3, 3. That is, as shown in FIG. 2, the floor portion 5c of the flat floor 5 has a large width W so that the side ends 5e, 5e of the floor 5 are positioned externally of the outer surfaces 3a, 3a of the rear wheels 3, 3. Both sides at a rear end of the floor portion 5c are also positioned externally of the outer surfaces 3a, 3a of the rear wheels 3, 3.

As explained above, since the electric wheelchair 1 in accordance with the present invention has the floor 5 of width larger than the distance between the outer surfaces 3a, 3a of the rear wheels 3, 3, it has no lateral protrusions at that part of the body thereof where the rear wheels, 3, 3 and the rear fenders 6a, 6a are incorporated. Consequently, a user can get aboard the electric wheelchair 1 smoothly without bumping his legs and body parts against the wheelchair body portion including the rear wheels. Particularly, the electric wheelchair 1 allows the aged with feeble lower limbs or physically handicapped persons to get on and off it with ease.

In the electric wheelchair 1 of the present invention, the maximum width of the front part of the floor 5 is set to be smaller than, or substantially equal to, the distance between the outer surfaces 2a, 2a of the front wheels 2, 2. In the described embodiment, the maximum width of the floor 5 is smaller than the distance between the outer surfaces 2a, 2a of the front wheels 2, 2, as shown in FIG. 2. Thus, by using the distance between the outer surfaces 2a, 2a as a reference, the electric wheelchair 1 can be propelled without an obstacle being hit by the rear part of the wheelchair body.

Reference is now had to FIGS. 5 to 8 wherein the electric wheelchair is shown with the cover and the floor removed.

Support frame 12 includes a pair of right and left horizontal portions 12a, 12a which are laid substantially horizontally relative to the ground surface. The distance between the right and left horizontal portions 12a, 12a at their front parts is reduced while the distance between the horizontal portions at their intermediate and rear parts is enlarged.

Figure 5:
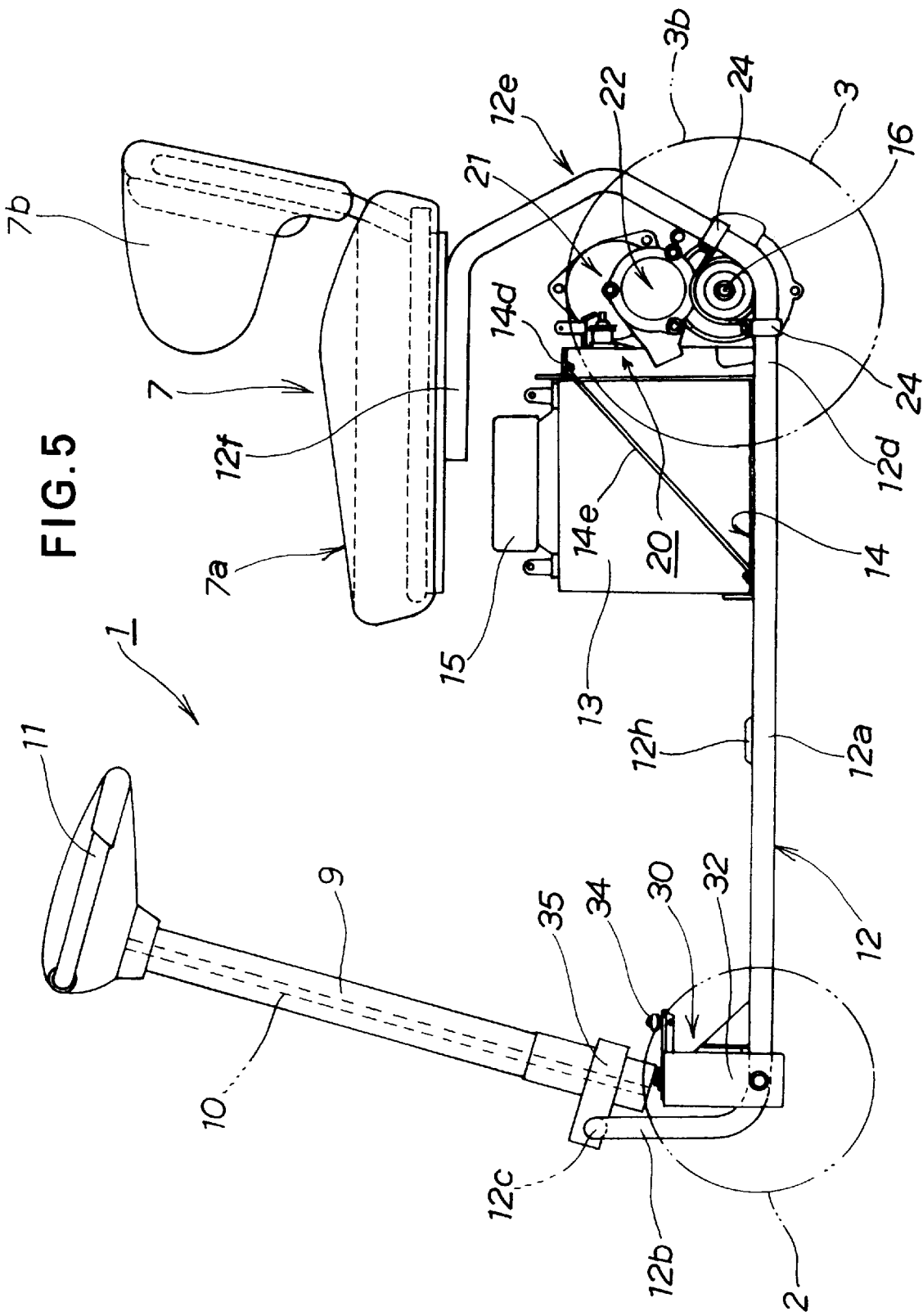
FIG. 5 is a side view illustrating the electric wheelchair of FIG. 1 but with its armoring parts removed.
Figure 6:
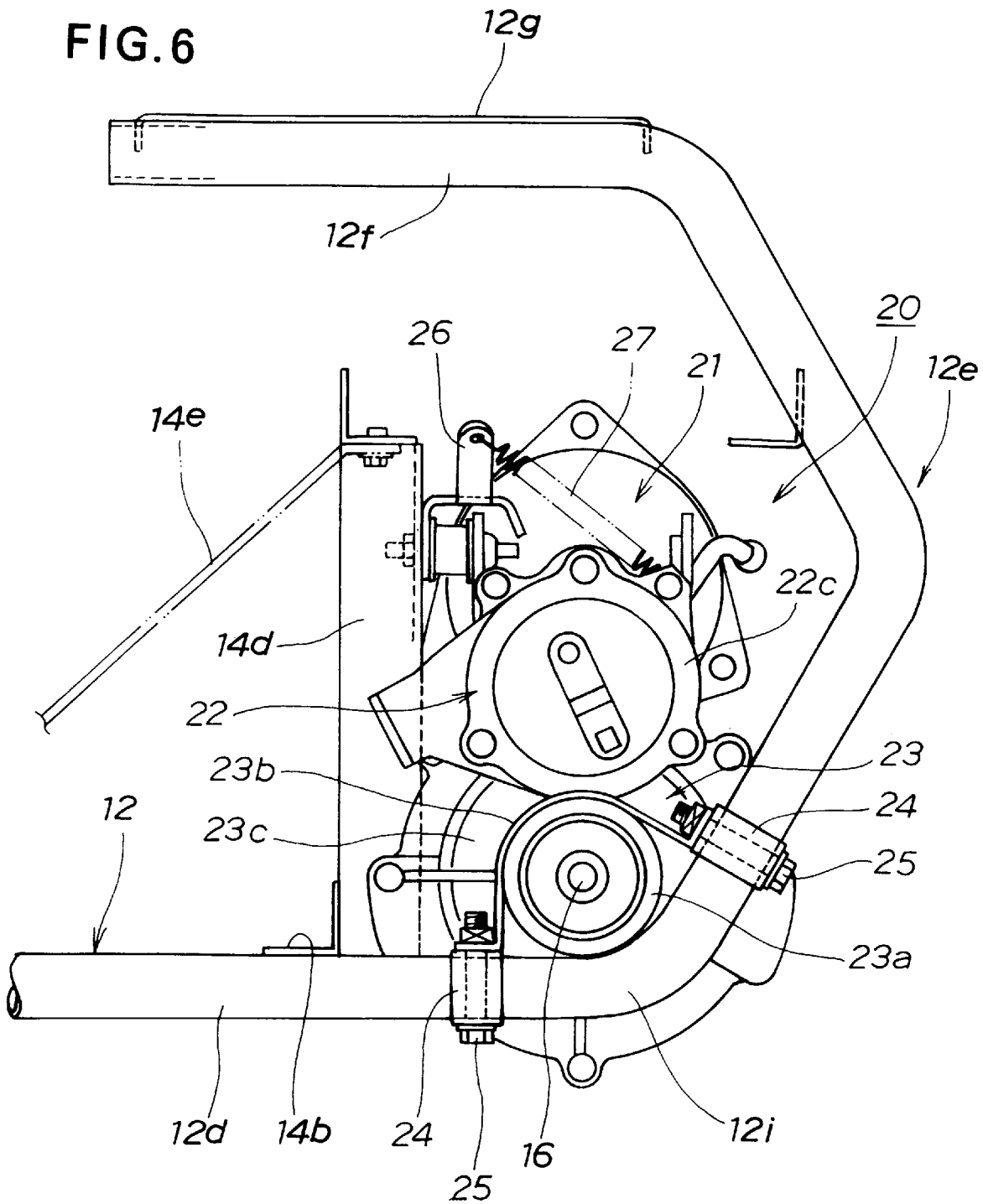
FIG. 6 is an enlarged view illustrating a rear portion of the electric wheelchair of FIG. 5.

At their front ends, the horizontal portions 12a, 12a have rising portions 12b, 12b. The upper ends of these rising portions 12b, 12b are interconnected by a bridge portion 12c. As shown in FIGS. 5 and 6, each horizontal portion 12a includes a C-shaped portion 12e at a rear end thereof, which has an inverted C-shaped configuration as viewed from sideways.

Figure 7:
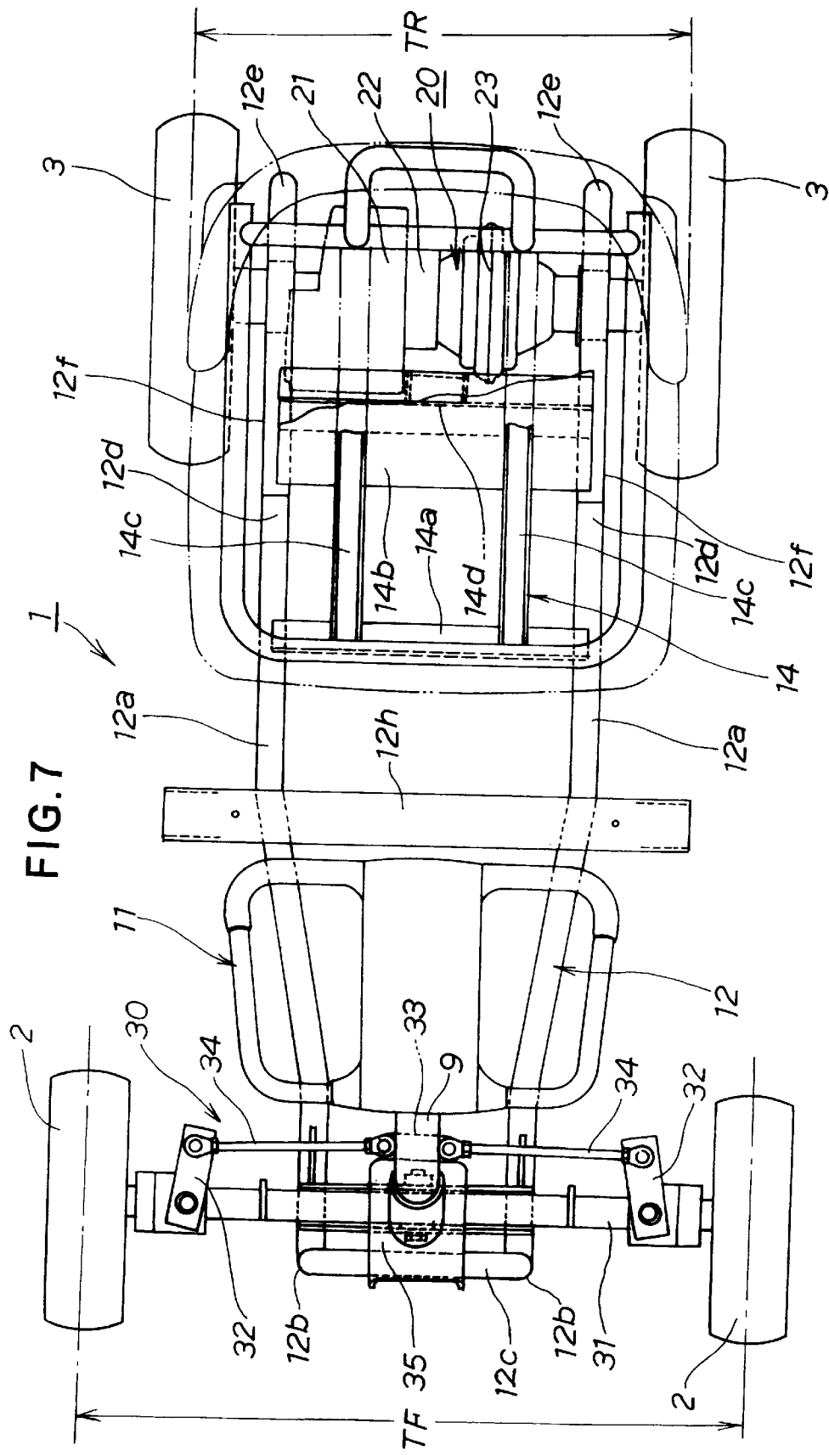
FIG. 7 is a top plan view illustrating the electric wheelchair of FIG. 5.
Figure 8:
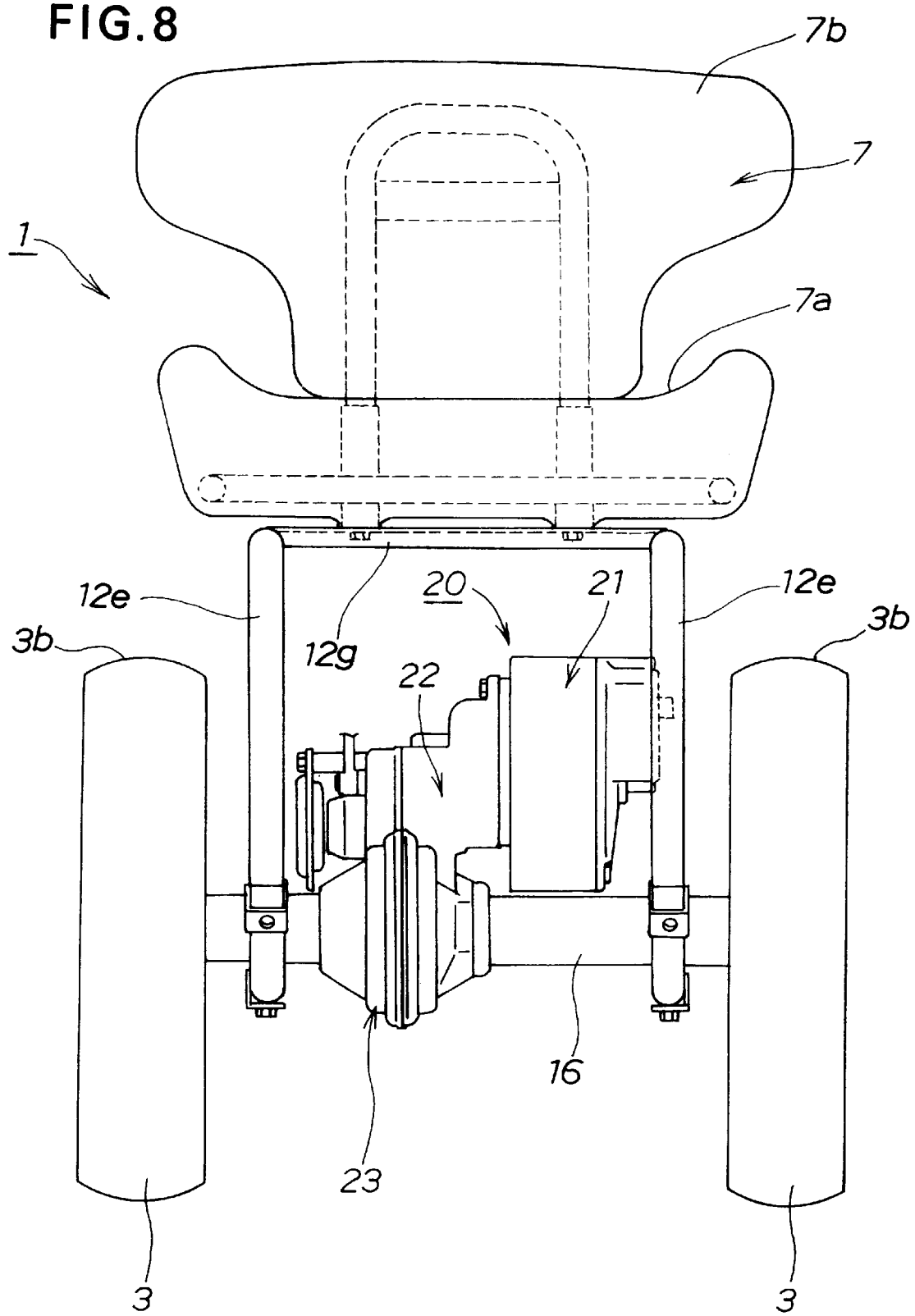
FIG. 8 is a view similar to FIG. 4 but illustrating the electric wheelchair with its armoring parts removed.

Each C-shaped portion 12e opens forwardly. Seat support portions 12f, 12f extend forwardly from an upper end of the C-shaped portion 12e. The frame 12 is formed from a pipe of U-shape as viewed in top plan, with the rising portions 12b and the C-shaped portion 12e formed by folding the front and rear portions of the pipe into the required shapes. As shown in FIG. 7, a cross member 12h extends between and across the horizontal portions 12a, 12a forming the frame 12.

As shown in FIG. 6, a cross plate 12g extends between the seat support portions 12f, 12f and supports thereon the sitting portion 7a of the seat 7.

Designated by reference numeral 13 is a battery retained by a battery holder 14 positioned below the seat 7. The battery holder 14 comprises two cross members 14a, 14b, right and left support members 14c, 14c, and a post member 14d. The cross members 14a, 14b are spaced from each other in a front-and-rear direction of the wheelchair and extend between the horizontal portions 12a, 12a of the frame 12 immediately below the seat 7. The support members 14c, 14c are spaced from each other laterally and extend between and across the cross members 14a, 14b. The post member 14d extends upwardly from an intermediate portion of the rear cross member 14b. The battery 13 is thus positioned below the seat 7. In FIGS. 5 and 5, reference numeral 14e designates a side support member for supporting a side portion of the battery 13. A control box 15 is placed on the battery 13.

As shown in FIG. 6, a rear wheel driving mechanism 20 comprises a motor 21 provided at an upper level for driving the rear wheels 3, 3, and a reduction gear 22 positioned below the motor 21. The rear wheel driving mechanism 20 is disposed on an axle 16 between the rear wheels 3, 3. The reduction gear 22 includes a differential portion 23 connected thereto and positioned below the lower part of the reduction gear 22. Although now shown, the reduction gear 22 houses a planetary roll mechanism therein. By the reduction gear 22 having the differential portion 23, the electric wheelchair of the present invention is rendered capable of small sharp turns.

The reduction gear 22 including such differential portion 23, and the rear wheel driving motor 21 are laid on the axle 16 one over the other, instead of being displaced in a front-and-rear direction about the axle 16. As a result, the length of the frame 12 of the electric wheelchair 1 is reduced, thereby down-sizing the wheelchair, as can be readily appreciated from FIG. 5. This further renders the electric wheelchair 1 easy to operate and more useful.

As shown in FIG. 5, the bearing portion 23a of the axle 16 faces a side portion of the differential portion 23 of the reduction gear 22 and is positioned on a lower curved portion 12i of the C-shaped portion 12e.

Band 23b for securing the differential portion 23 is disposed to surround the bearing portion 23a. The band 23b is connected at both ends to those portions of the C-shaped portion that are proximate to the curved portion 21i, through mounting members 24, 24 via bolts and nuts 25, 25.

Casing 22c of the reduction gear 22 disposed above the differential portion 23 is connected to a casing 23c of the differential portion 23. A spring 27 is disposed between a stay 26, provided at an upper part of the rear surface of the post member 14d, and the casing 22c of the reduction gear 22.

As shown in FIG. 5, the driving mechanism 20 comprising the motor 21 and the reduction gear 22 is located within the outline 3b of each rear wheel 3 as viewed the same from sideways, and more particularly within an upper half of such outline.

Since the rear wheel driving motor 21 and the reduction gear 22 are disposed on the rear wheel axle 16 as explained above, an increased load is imparted on the axle 16. As a result, the contact pressure of the rear wheels 3 against the road surface is increased, thereby increasing efficiency of transmission of the driving force of the motor.

The reduction gear 22 including the motor 21 and the differential portion 22 is disposed between right and left rear wheels 3, 3 as viewed the electric wheelchair 1 from behind. More specifically, the motor 21 and the reduction gear 22 are disposed between the right and left C-shaped portions 12e, 12e.

Since the rear wheel driving motor 21 and the reduction gear 22 are disposed between the rear wheels 3, 3 such that they are positioned within the outline of the rear wheel 3 as viewed the electric wheelchair 1 in side elevation, as explained above and shown in FIG. 5, the rear wheel driving mechanism 20 is concealed within the outline 3b of the rear wheel 3 and thus protected from obstacles that may be present at the sides of the electric wheelchair 1. This arrangement is thus advantageous for the protection of the rear wheel driving motor 21 and the reduction gear 22, compared to the known arrangements in which their sides are covered by a cover or the like.

By positioning the components of the driving mechanism 20 such as the rear wheel driving motor 21 and the reduction gear 22 between the rear wheels 3, 3 in a vertically overlapped fashion, as explained above, it becomes possible to minimize the tread between the rear wheels 3, 3 and hence the width of the wheelchair body, as well as the wheelchair body length. As a result, an electric wheelchair is provided which is small-sized and hence easy to operate.

The arrangement of the electric wheelchair will now be described schematically with reference to FIGS. 5 and 7.

Steering mechanism 30 of the front wheels 2, 2 is provided immediately behind the rising portion 12b of the frame 12 and the bridge portion 12c. The front wheels 2, 2 are supported at the ends of an arm 31.

The steering shaft 10 passes through the handle post 9. The steering action of the steering shaft 10 is transmitted to a center arm 33 via, e.g., a rack and pinion mechanism. The ends of the center arm 33 and knuckle arms 32, 32 are connected via tie rods 34, 34. Reference numeral 35 designates a mounting base for the handle post 9.

Top end of the steering shaft 10 is connected to the steering handle 11. The steering action of the handle 11 is transmitted to the center arm 33 and then to the tie rods 34, 34 to cause the knuckle arms 32, 32 to be rotated in the same direction to thereby steer the front wheels 2, 2.

Obviously, various minor changes and modifications of the present invention are possible in the light of the above teaching. It is therefore to be understood that within the scope of the appended claims, the present invention may be practiced otherwise than as specifically described.

What is claimed is:

1. An electric wheelchair comprising two front wheels, two rear wheels, a seat disposed at a widthwise center of said electric wheelchair, a steering handle for steering said front wheels, a flat floor disposed between said steering handle and said seat below said seat, a battery and a rear wheel driving motor disposed below said seat, wherein a tread between said rear wheels is smaller than a tread between said front wheels, and said floor has opposed side ends located externally of outer surfaces of said rear wheels so that it has a larger width than a distance between the rear wheel outer surfaces; and wherein said electric wheelchair further includes a reduction gear and a differential portion, and said driving motor and said reduction gear are vertically disposed on a rear wheel axle one over the other, and said differential portion is positioned below said reduction gear, and said driving motor, said reduction gear and said differential portion are positioned within an outline of said rear wheels when said rear wheels are viewed from a side elevation.

2. An electric wheelchair comprising two front wheels, two rear wheels, a seat disposed at a widthwise center of said electric wheelchair, a steering handle for steering said front wheels, a flat floor disposed between said steering handle and said seat below said seat, a battery and a rear wheel driving motor disposed below said seat, wherein said rear wheels are larger in diameter than said front wheels, said electric wheelchair further includes a reduction gear, a differential portion, and a rear wheel axle, and said rear wheel driving motor and said reduction gear are vertically disposed on said rear wheel axle one over the other, and said differential portion is positioned below said reduction gear; and wherein said driving motor, said reduction gear and said differential portion are positioned within the outline of said rear wheels when said rear wheels are viewed from a side elevation.

3. An electric wheelchair according to claim 2, wherein said driving motor and said reduction gear are positioned between said rear wheels when said rear wheels are viewed from a rear direction.

4. An electric wheelchair comprising two front wheels, two rear wheels, a seat disposed at a widthwise center of said electric wheelchair, a steering handle for steering said front wheels, a flat floor disposed between said steering handle and said seat below said seat, a battery and a rear wheel driving motor disposed below said seat, wherein a tread between said rear wheels is smaller than a tread between said front wheels, and said floor has opposed side ends located externally of outer surfaces of said rear wheels so that it has a larger width than a distance between the rear wheel outer surfaces, and wherein said rear wheels are larger in diameter than said front wheels, said electric wheelchair further includes a reduction gear, a differential portion, and a rear wheel axle, and said rear wheel driving motor and said reduction gear are vertically disposed on said rear wheel axle one over the other, and said differential portion is positioned below said reduction gear, and said driving motor, said reduction gear, and said differential portion are positioned within an outline of said rear wheels when said rear wheels are viewed from a side elevation.

* * * * *